Jan. 2, 1923.
F. W. PETERS.
UNIVERSAL JOINT.
FILED FEB. 7, 1919
1,440,890
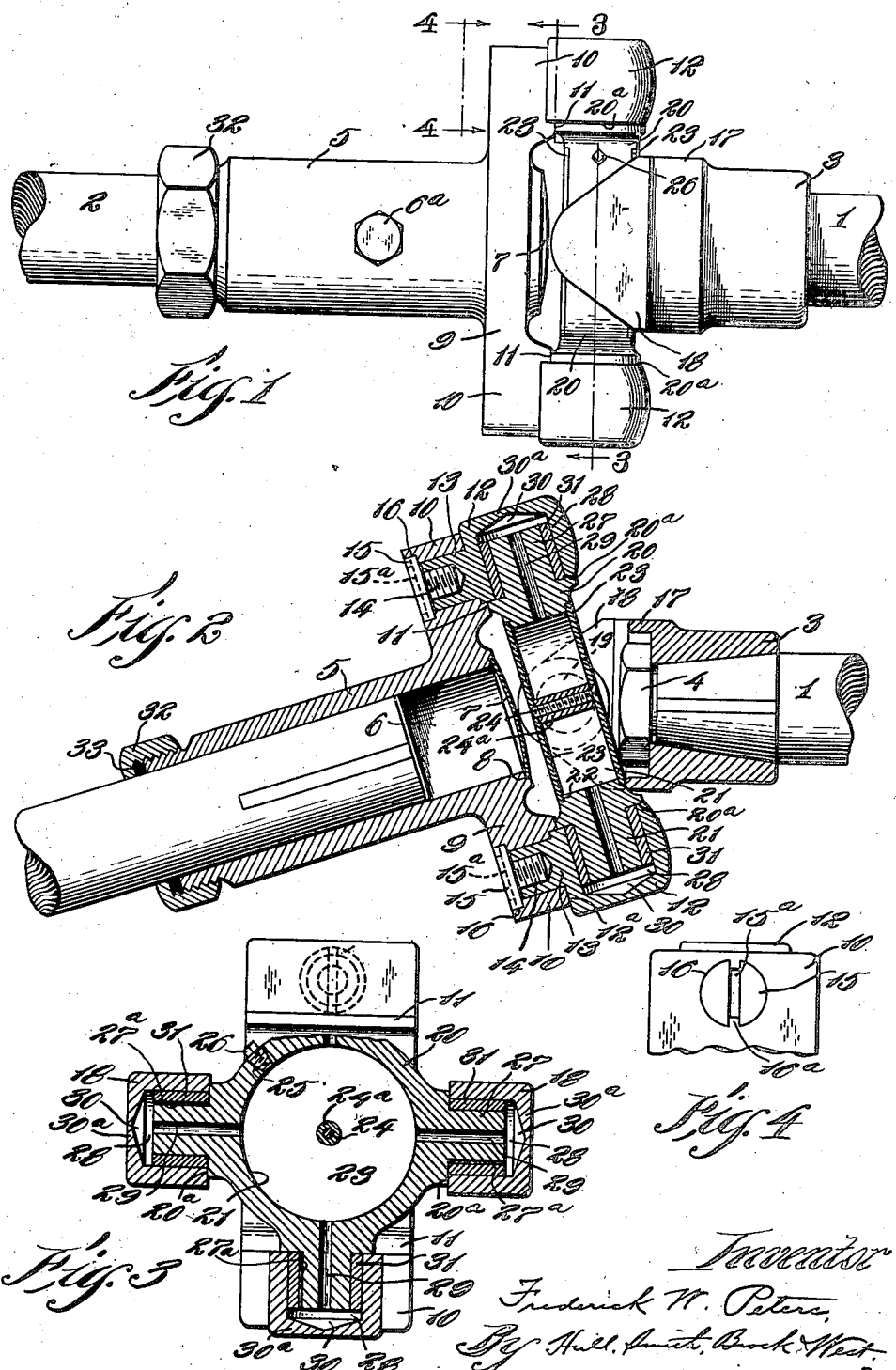

Patented Jan. 2, 1923.

1,440,890

UNITED STATES PATENT OFFICE.

FREDERICK W. PETERS, OF WEST PARK, OHIO, ASSIGNOR TO THE PETERS MACHINE & MANUFACTURING COMPANY, OF CLEVELAND, OHIO, A CORPORATION OF OHIO.

UNIVERSAL JOINT.

Application filed February 7, 1919. Serial No. 275,503.

*To all whom it may concern:*

Be it known that I, FREDERICK W. PETERS, a citizen of the United States, residing at West Park, in the county of Cuyahoga and State of Ohio, have invented a certain new and useful Improvement in Universal Joints, of which the following is a full, clear, and exact description, reference being had to the accompanying drawings.

This invention relates to universal joints and has for its object to improve and simplify the construction of such joints; to insure efficient lubrication of the trunnions and their bearings, and to reduce the cost of production. I realize the foregoing general objects, and other more limited objects which will appear hereinafter, in and through the embodiment of my invention illustrated in the drawings forming a part hereof, wherein Fig. 1 represents a side elevation of such joint, with its cooperating parts; Fig. 2 a central longitudinal section through such joint and parts certain of the parts being shown in elevation; Fig. 3 a transverse sectional view corresponding to the line 3—3 of Fig. 1 certain parts being broken away; and Fig. 4 a detail in plan of one of the flanged projections.

Describing by reference characters the various parts illustrated herein, 1 and 2 denote the end portions of shaft sections connected by my joint. The shaft section 1 is provided with a hub 3 which may be splined thereto, the hub being shown as provided with a tapered bore for the reception of the correspondingly tapered portion of the shaft end. At its extreme end, the shaft section is reduced and threaded for the reception of a nut 4, by means of which and the spline it is connected to the hub. The shaft section 2 is also splined to an elongated hub 5 which is shown as extending beyond the end of the shaft and providing therefor a lubricant well 6 having a filling opening closed by a removable plug $6^a$ and closed at its outer end by means of a concavo-convex plate 7 forced to a seat 8, said plate being preferably what is known to the trade as a "Welch plug." Extending transversely of the inner end of the hub is a supporting base or flange 9 having at each end thereof a flanged projection 10 which is faced off and machined to provide an accurate seat for the base of a bearing block, being provided with a shoulder 11 which is adapted to bear against and align the adjacent side $12^a$ of the bearing block 12 with reference to a trunnion of the cross member. Each block is provided with a stud 13 projecting from the base thereof into and nearly through a bore in the outer end of the base flange 9, the stud making a snug fit with said bore and being internally threaded to receive a stud bolt 14. Each stud bolt 14 is provided with a cylindrical head 15 adapted, when the bolt is screwed to fit within an annular recess 16 formed within the bottom of each flanged projection of the base and constituting an enlargement of the bore thereof. The annular recesses 16 are preferably each of the same depth as the heads 15, whereby the bottoms of said heads will be substantially flush with the bottoms of their respective flanged projections. Each bolt head may be slotted, as shown at $15^a$, for the reception of a screw driver and, when the bolts are set up, they may be retained in place by merely staking or peening the metal at the base of the flanged projections into one or both ends of each slot, as shown at $16^a$, Fig. 4.

The hub 3 is provided with a base 17 similar to the base 9 and having seats for blocks 18 similar in construction and arrangement to the corresponding parts carried by the hub 5. The stud of one of said blocks is indicated in dotted lines at 19, Fig. 2.

20 denotes generally the cross member carrying the trunnions and connecting the two shaft ends through the bearing blocks. This cross member consists of a central cylindrical portion having a cup 21 formed therein, the outer ends of said cup being provided with machined seats 22 for the reception of a concavo-convex plate 23 of the "Welch plug" type and adapted to be secured in place by forcing the central portions of the plates inwardly or toward each other. If desirable the plates may be further secured in place by torch welding them in their seats; or they may be connected at their center portions, as by a screw 24 and a spacing sleeve $24^a$. The cup and closures 23 constitute a centrally located lubricating well to which the lubricant may be conveniently supplied from time to time by means of an opening 25 having a removable plug 26 therein.

Projecting from the cross member are the trunnions 27. Each trunnion is shown as shorter than the bore 28 provided therefor in its bearing block and is provided with a radial port 29, the inner end whereof communicates with the well or cup 21. The outer end of each bore 28 terminates within the body of its bearing block, providing beyond the outer end of each trunnion a well 30 with which the outer end of a port 29 communicates. Surrounding each trunnion is a bushing 31. The outer end of each well 30 is thus closed by a wall 30ª integral with its bearing block. It will be noted that the outer end of each bore is tapered from the side toward the central outer end thereof and that each trunnion is shouldered, as at 20ª. This provides depth for the wells 30 and a seat for each block as well as for the inner end of each bushing.

In order to prevent unnecessary loss of lubricant from the well 6, the end of the hub 5 remote from such well is shown as provided with a shouldered nut 32, with a packing ring 33 interposed between the shoulder of such nut and the hub end.

In assembling, the cross member 20 may be connected to one of the supporting bases or flanges by means of the bearing blocks, studs and bolts, after which the other two blocks may be slipped over their corresponding trunnions, their studs inserted into the appropriate bores provided therefor in the base or flange on the opposite hub, and the bolts set up, the shoulders, shown at 11, provided at the inner ends of their seats serving to properly align the blocks with reference to the trunnions and prevent rotation of the blocks.

The construction of the cross member insures maximum lubricating efficiency, since the lubricant within the well 21 will be thrown out by centrifugal action through the ports 29 into the wells 30 and back up therefrom into the spaces between the trunnions and the bushings and between the latter and the bearings surrounding the bushings, the trunnions being flattened on their outer longitudinal surfaces as indicated at 27ª (Fig. 3) to provide ports extending longitudinally thereof communicating with the wells 30.

Having thus described my invention, what I claim is:—

1. In a universal joint, the combination of a shaft section, a base carried by said shaft section and having seats on opposite portions thereof and bores extending therethrough at right angles to said seats, a bearing block adapted to rest upon each seat and provided with a stud adapted to enter the bore thereof, said stud having an internally threaded bore extending from the outer end thereof, and a bolt adapted to be threaded into the bore of each stud and to bear against said base.

2. In a universal joint, the combination of a shaft section, a base having a seat and a bore extending therethrough at right angles to said seat, the outer end of said bore being enlarged, a bearing block adapted to rest on said seat and having a stud of less length than said bore and provided with an internally threaded bore, and a bolt adapted to be threaded into the bore of said stud and having a head cooperating with the enlarged end of the first mentioned bore.

3. In a universal joint, the combination of a shaft section, a base having a seat and a bore extending therethrough from said seat, the outer end of said bore being enlarged, a bearing block adapted to rest on said seat and having a stud of less length than said bore and provided with an internally threaded bore, and a bolt adapted to be threaded into the bore of said stud and having a head cooperating with the enlarged end of the first mentioned bore, the bolt head being slotted and the metal of the base projecting within said slot thereby to retain the bolt against rotation.

In testimony whereof, I hereunto affix my signature.

FREDERICK W. PETERS.